US008539504B2

(12) United States Patent
Bigelis et al.

(10) Patent No.: US 8,539,504 B2
(45) Date of Patent: Sep. 17, 2013

(54) HETEROGENEOUS ARCHITECTURE IN POOLING MANAGEMENT

(75) Inventors: Sigitas Bigelis, San Jose, CA (US); Sherry Guo, Fremont, CA (US); Bilung Lee, Fremont, CA (US); Paul A. Ostler, Boise, ID (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/847,630

(22) Filed: Aug. 30, 2007

(65) Prior Publication Data
US 2009/0064199 A1    Mar. 5, 2009

(51) Int. Cl.
*G06F 9/46* (2006.01)

(52) U.S. Cl.
USPC ........... 719/312; 719/313; 719/321; 719/328; 709/217; 707/705; 707/713; 707/718; 707/781

(58) Field of Classification Search
None
See application file for complete search history.

(56) References Cited

U.S. PATENT DOCUMENTS

| | | | | |
|---|---|---|---|---|
| 5,596,744 | A * | 1/1997 | Dao et al. | 1/1 |
| 5,634,053 | A * | 5/1997 | Noble et al. | 1/1 |
| 5,897,634 | A * | 4/1999 | Attaluri et al. | 1/1 |
| 6,115,703 | A * | 9/2000 | Bireley et al. | 707/704 |
| 6,434,543 | B1 * | 8/2002 | Goldberg et al. | 707/802 |
| 6,618,719 | B1 * | 9/2003 | Andrei | 1/1 |
| 7,024,406 | B1 * | 4/2006 | Kunisetty et al. | 1/1 |
| 7,089,565 | B2 | 8/2006 | Kan et al. | |
| 7,134,008 | B2 | 11/2006 | Dutt et al. | |
| 7,181,491 | B2 | 2/2007 | Lu | |
| 2002/0023261 | A1 * | 2/2002 | Goodwin et al. | 717/146 |
| 2002/0091702 | A1 * | 7/2002 | Mullins | 707/100 |
| 2002/0091712 | A1 * | 7/2002 | Martin et al. | 707/200 |
| 2002/0123978 | A1 * | 9/2002 | Bird et al. | 707/1 |
| 2002/0133504 | A1 * | 9/2002 | Vlahos et al. | 707/104.1 |
| 2003/0023596 | A1 * | 1/2003 | Boudreau | 707/9 |
| 2003/0220941 | A1 * | 11/2003 | Arnold et al. | 707/200 |
| 2003/0221021 | A1 * | 11/2003 | Kan et al. | 709/315 |
| 2004/0045008 | A1 * | 3/2004 | June et al. | 719/316 |
| 2004/0088413 | A1 * | 5/2004 | Bhogi et al. | 709/226 |
| 2004/0172390 | A1 * | 9/2004 | Srivastava et al. | 707/3 |
| 2004/0221031 | A1 * | 11/2004 | Desai | 709/224 |
| 2004/0255307 | A1 * | 12/2004 | Irudayaraj | 719/328 |
| 2005/0015356 | A1 * | 1/2005 | Ireland et al. | 707/1 |
| 2005/0038801 | A1 | 2/2005 | Colrain et al. | |
| 2005/0050039 | A1 * | 3/2005 | Theobald et al. | 707/4 |
| 2006/0074877 | A1 * | 4/2006 | Kuersch et al. | 707/3 |

(Continued)

OTHER PUBLICATIONS

"HP Neoview JDBC Type 4 Driver Programmer'S Reference"; HP Part No. 542708-002; Edition 1; Aug. 2006.

*Primary Examiner* — Andy Ho
*Assistant Examiner* — Shih-Wei Kraft
(74) *Attorney, Agent, or Firm* — Yudell Isidore Ng Russell PLLC

(57) ABSTRACT

A method, system, and computer program product for managing a heterogeneous connection pooling structure. The heterogeneous architecture of pooling management comprises connections having different connection attributes (i.e. different data source properties) that can share a same connection pool (i.e. same connection pool data source). An application requests a connection from data source having a specified data source property. An application server searches a pool module for an available cached connection. If a cached connection is available, the cached connection is automatically selected as a returned connection. A connection reuse protocol and a statement reuse protocol is determined and invoked to reconfigure the cached connection for reuse as a connection between the application and a database server.

20 Claims, 6 Drawing Sheets

(56) References Cited

U.S. PATENT DOCUMENTS

| | | |
|---|---|---|
| 2006/0074955 A1 | 4/2006 | Kuersch et al. |
| 2006/0095572 A1 | 5/2006 | Burke et al. |
| 2007/0073853 A1 | 3/2007 | Azizi et al. |
| 2007/0083526 A1 | 4/2007 | Srivastava |
| 2007/0136311 A1 | 6/2007 | Kasten et al. |
| 2007/0192328 A1* | 8/2007 | Handa et al. ............... 707/10 |
| 2008/0065589 A1* | 3/2008 | Birka et al. ................. 707/2 |

\* cited by examiner

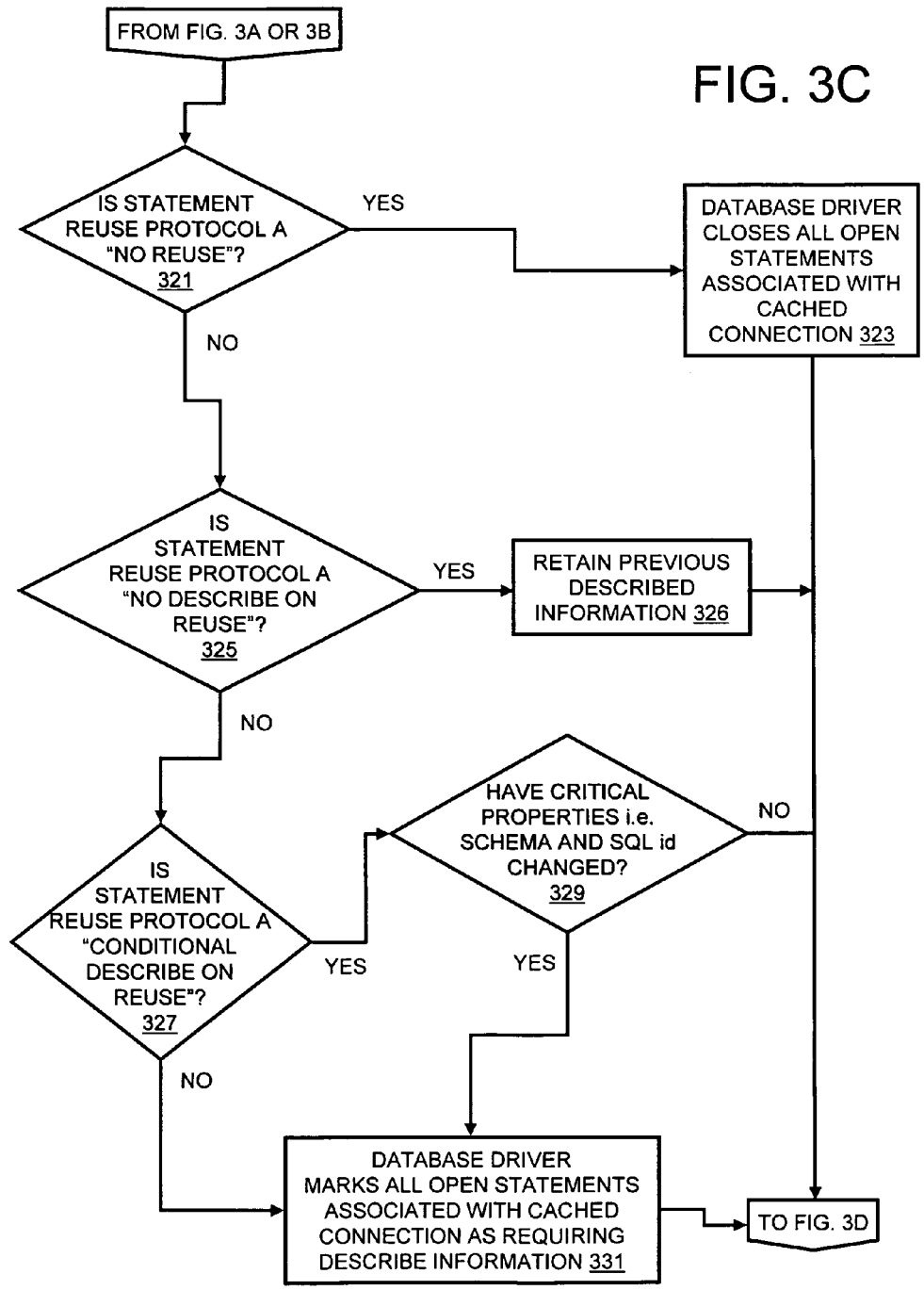

HETEROGENEOUS ARCHITECTURE IN POOLING MANAGEMENT

BACKGROUND OF THE INVENTION

1. Technical Field

The present invention generally relates to computer systems and in particular to connection pooling management architecture in computer systems.

2. Description of the Related Art

The connection pooling management structure using a common application programming interface (API), such as Java Database Connectivity (JDBC), describes a standard interaction among an application, an application server, and a database driver. The application can request a connection from a data source using the application server. The application server may in turn either (i) return a cached connection from the application server's own connection pool module, or (ii) get a new connection from a connection pool data source using the database driver. Database drivers are available for most database platforms so that applications can invoke the API to retrieve the information stored in a database. The common implementation of this dichotomy of data sources, connection pool modules, and connection pool data sources is the homogeneous connection pooling model, which naturally treats the data source and the connection pool data source as one and the same. Moreover, the homogenous connection pooling model provides only one connection pool module per data source (i.e. a 1:1 correspondence between the data source and the connection pooling data source) and does not support connections to be cached across multiple data sources having different data source properties. Therefore, the homogeneous connection pooling model does not exploit the full potential of the connection pooling management structure, especially when those multiple data sources represent the same underlying database server with only some different property settings.

Furthermore, as described by the connection pooling management structure using JDBC, the application should not see any difference between the data source that is accessed with connection pooling implementation and the data source that is not accessed with connection pooling implementation. Stated differently, the application should always receive a "clean" connection, whose connection attributes match the data source properties specified on the data source where the connection originates from. However, under the homogeneous connection pooling model, the connection is taken (or "reused") from the connection pool module of an application server without any cleanup of the connection attributes of the connection from previous reuses of the connection. Instead, special registers and global temp tables from the previous use of the connection remain in effect for the new use of the connection.

To alleviate this problem of an unclean connection, the application server often needs to impose a constraint such that data source properties cannot change for the connection pool module. Despite the imposition of these constraints, the application may still encounter the problem of an unclean connection if the special registers and global temp tables are set through runtime interfaces rather than as data source properties. Under such circumstance where the special registers and global temp tables are set through runtime interfaces, the application has to perform the cleanup after the application is done using the connection. The above scenario provides an extra burden and overhead for the application, since the application must insert code to reset the application's own special registers and global temp tables, such that the values of the data source properties are properly passed and there are no inconsistencies between a database server and the database driver.

SUMMARY OF AN EMBODIMENT

Disclosed are a method, system, and computer program product for managing a heterogeneous connection pooling structure. The heterogeneous architecture of pooling management comprises connections having different connection attributes (i.e. different data source properties) that can share the same connection pool (i.e. same connection pool data source). A new set of reuse and recycle interfaces is added onto the database driver for interaction between the connection pool module of the application server and the database driver. The new set of interfaces are used for a cached connection during the cached connection's life cycle, as the cached connection is taken (or "reused") from and returned (or "recycled") to a connection pool module.

In addition, two new pooling parameters, a connection reuse protocol and a statement reuse protocol, are introduced on a connection pool data source to configure how cached connections and statements are reset (i.e. clean up and reconfigure the data source properties associated with the reused cached connection) for reuse. Once an application server finds an available cached connection from a connection pool module, the cached connection is automatically selected as the returned connection and a connection reuse protocol and a statement reuse protocol is determined to establish a connection between the application and a database server. The method employed by the invention provides support for a rich selection of pooling semantics. In this regard, the application server can choose from the most intelligent reuse protocols that impose the fewest constraints/burdens (i.e. the most flexible, yet least efficient reuse protocol) on an application or the most efficient protocols that impose greater constraints on the application. The heterogeneous connection pooling model enhances the current homogenous connection pooling model by increasing the reusability of pooled connections across heterogeneous data sources. Notably, the heterogeneous connection pooling model also alleviates the application of the extra burden and overhead that results from this increased efficiency.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3A-3D represent individual parts of a high level logical flowchart illustrating the method of managing a heterogeneous connection pooling architecture, in accordance with one embodiment of the invention.

DETAILED DESCRIPTION OF AN ILLUSTRATIVE EMBODIMENT

The illustrative embodiments provide a method, system, and computer program product for managing a heterogeneous connection pooling architecture, in accordance with one embodiment of the invention. As utilized herein, a heterogeneous connection pooling architecture is a type of database management architecture in which connections with different connection attributes can share the same connection pool and thus can be cached across multiple data sources containing different data source properties. Also as utilized herein, a connection attribute is a value associated with a connection that allows for the proper access of a database. Further, as utilized herein, a connection pool is a cache of database connections maintained in an application server's memory so that the connections can be reused when the application server receives future requests to establish connections. Connection pools are used to enhance the performance of executing commands on a database. Opening and maintaining a database connection for each user, such as requests made to a dynamic database-driven Web application, is costly and wastes resources. In connection pooling, after a connection is created, the connection is placed in the connection pool (i.e. "recycled") and is used over again (i.e. "reused") so that a new connection does not have to be established. If all the connections are being used, a new connection is made and is added to the pool. Connection pooling also cuts down on the amount of time a user must wait to establish a connection to the database.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
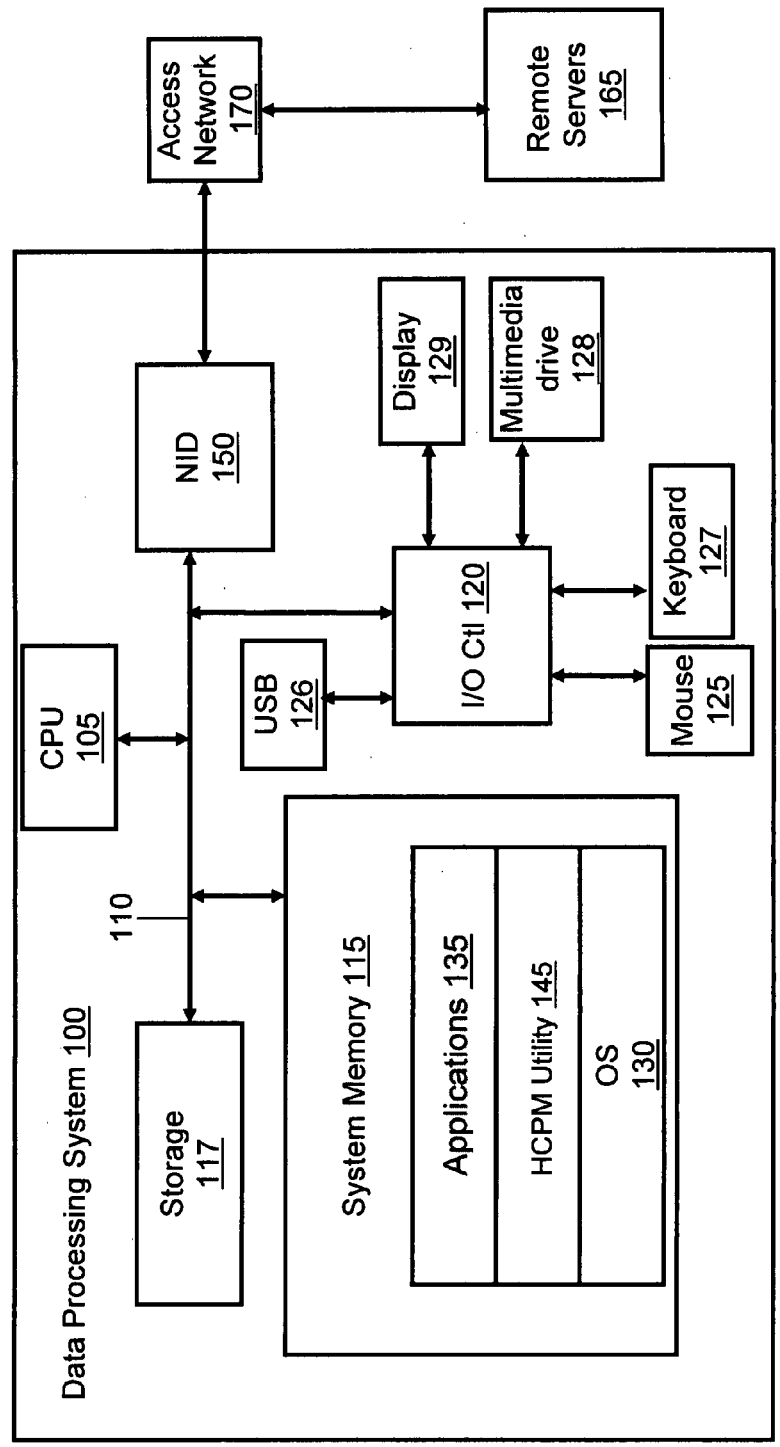
FIG. 1 is a high level block diagram representation of a data processing system, according to one embodiment of the invention.

With reference now to FIG. 1, depicted is a block diagram representation of a data processing system (DPS) (and connected network) 100. DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVDRW drive) and Universal Serial Bus (USB) hub 126 are illustrated, coupled to I/O controller 120. Multimedia drive 128 and USB hub 126 may operate as both input and output (storage) mechanisms. DPS 100 also comprises storage 117, within which data/instructions/code may be stored. DPS 100 is also illustrated with a network interface device (NID) 150 coupled to system bus 110. NID 150 enables DPS 100 to connect to one or more remote servers 165 via an access network 170, such as the Internet.

In the described embodiments, when access network 170 is the Internet, access network represents a worldwide collection of networks and gateways that utilize the Transmission Control Protocol/Internet Protocol (TCP/IP) suite of protocols to communicate with one another. Of course, network access may also be provided via a number of different types of networks, such as an intranet, an Ethernet, a Local Area Network (LAN), a Virtual Private Network (VPN), or other Wide Area Network (WAN) other than the Internet, for example.

Notably, in addition to the above described hardware components of DPS 100, various features of the invention are completed via software (or firmware) code or logic stored within system memory 115 or other storage (e.g., storage 117) and executed by CPU 105. In one embodiment, data/instructions/code from storage 117 populates the system memory 115, which is also coupled to system bus 110. System memory 115 is defined as a lowest level of volatile memory (not shown), including, but not limited to, cache memory, registers, and buffers. Thus, illustrated within system memory 115 are a number of software/firmware components, including operating system (OS) 130 (e.g., Microsoft Windows®, a trademark of Microsoft Corp; or GNU®/Linux®, registered trademarks of the Free Software Foundation and The Linux Mark Institute; or Advanced Interactive eXecutive-AIX-, registered trademark of International Business Machines—IBM), applications (APP) 135, and Heterogeneous Connection Pooling Management (HCPM) utility 145. In actual implementation, components or code of OS 130 may be combined with those of HCPM utility 145, collectively providing the various functional features of the invention when the corresponding code is executed by the CPU 105. For simplicity, HCPM utility 145 is illustrated and described as a stand alone or separate software/firmware component, which is added to an existing OS to provide/support the specific novel functions described herein.

CPU 105 executes HCPM utility 145 as well as OS 130, which supports the user interface (UI) features of HCPM utility 145. In the illustrative embodiment, HCPM utility 145 manages a heterogeneous architecture for connection pooling. Among the software code/instructions provided by HCPM utility 145, and which are specific to the invention, are: (a) requesting a connection from a data source having a specified data source property; (b) searching a pool module for a cached connection; (c) returning either the cached connection or a new connection from the application server to the application as a returned connection; (d) if the cached connection is available in the pool module, the cached connection is automatically selected as the returned connection and a connection reuse protocol and a statement reuse protocol is determined to connect the application to a database server; (e) utilizing the returned connection to access the database server; (f) terminating a use of the returned connection by the application; (g) invoking a recycle interface by the application server on the returned connection; (h) communicating a release request to release a set of selective resources (e.g. cursors and transactions) associated with the returned connection to the database server; and (i) placing the returned connection into the corresponding pool module. For simplicity of the description, the collective body of code that enables these various features is referred to herein as HCPM utility 145. According to the illustrative embodiment, when CPU 105 executes HCPM utility 145, DPS 100 initiates a series of functional processes that enable the above functional features as well as additional features/functionality, which are described below within the description of FIGS. 2-3D.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the AIX operating system or LINUX operating system.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
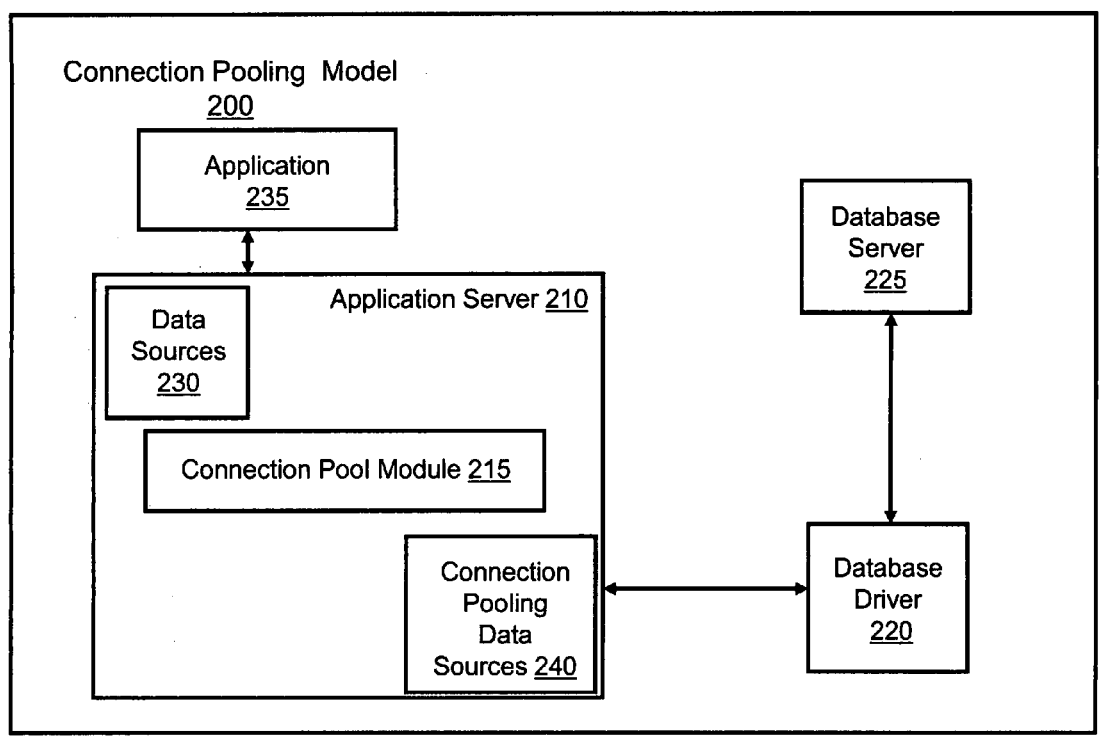
FIG. 2 is a high level block diagram of a database management structure, in accordance with one embodiment of the invention.
Figure 3A:
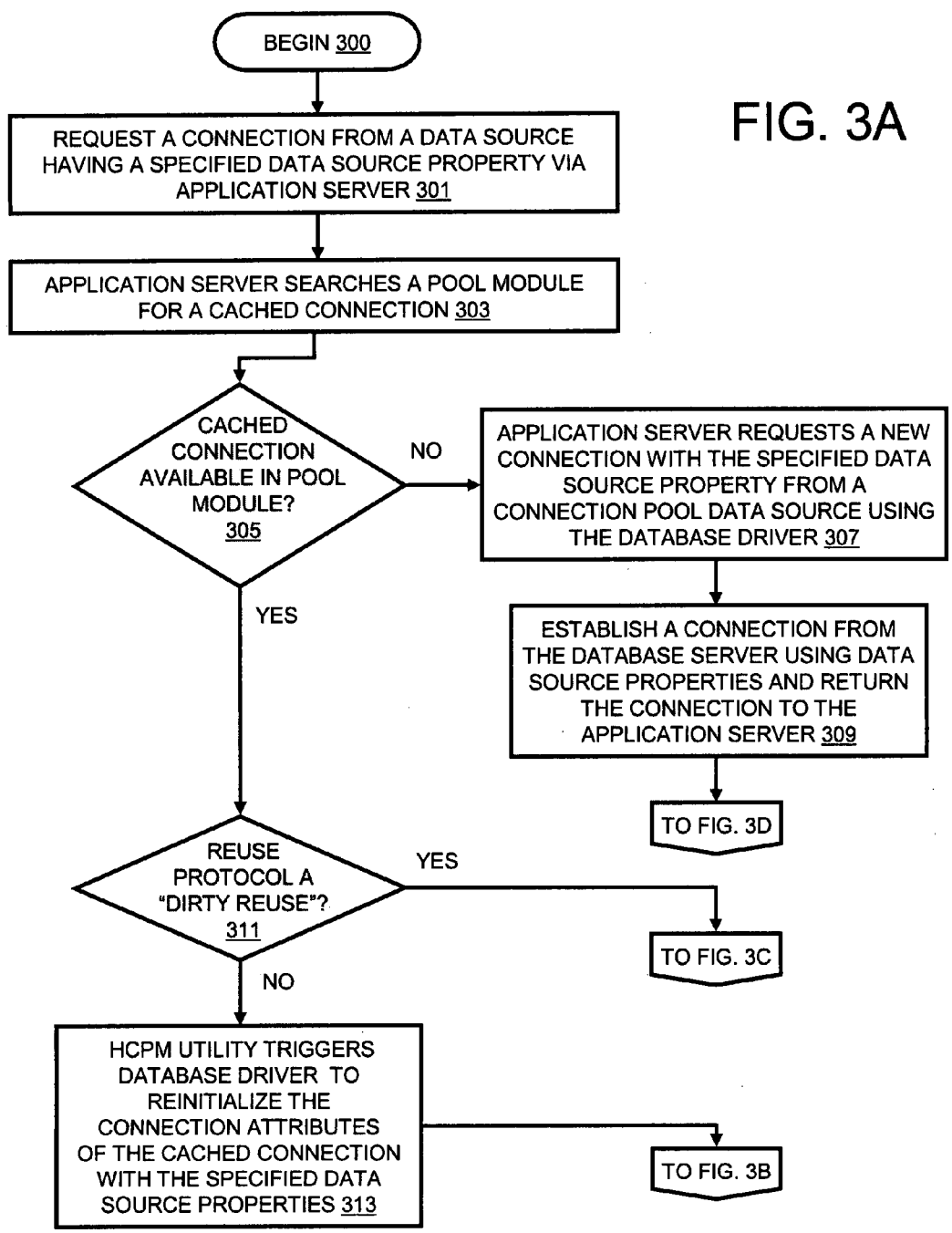

With reference now to FIG. 2, an exemplary connection pooling model 200, according to one embodiment of the invention. The connection pooling model 200 contains an application 235, an application server 210 associated with a connection pool module 215, a set of data sources 230, and a set of connection pooling data sources 240, a database driver 220, and a database server 225.

Application 235 interfaces with application server 210. Application server 210 is a software engine that handles most, if not all, of the data access of application 235. One benefit of an application server is the ease of application development, since applications 235 need not be programmed; instead, applications 235 are assembled from building blocks provided by the application server 210. Application 235 utilizes data source 230 as a bridge to interface with application server 210. In addition, application server 210 maintains connection pool module 215. Connection pool module 215 contains a cache of pooled connection objects that can be reused when requested by application 235. Moreover, a connection pool data source 240 is used as a bridge by application server 210 to interface with database driver 220. The database driver (e.g. Java Database Connectivity (JDBC) driver) 220 is responsible for establishing the actual physical connection to the database server 225.

FIGS. 3A-3D represent portions of a flow chart illustrating the exemplary method of managing heterogeneous connection pooling architecture, according to an illustrative embodiment of the invention. Although the following methods illustrated in FIGS. 3A-3D may be described with reference to components shown in FIGS. 1-2, it should be understood that this exemplary method is merely for convenience and alternative components and/or configurations thereof can be employed when implementing the various methods. Key portions of the methods may be completed by HCPM utility 145 (FIG. 1). HCPM utility 145 (FIG. 1) executes within DPS 100 (FIG. 1) and/or connection pooling model 200 (FIG. 2). Moreover, HCPM utility 145 (FIG. 1) controls specific operations of/on DPS 100 (FIG. 1) and connection pooling model 200 (FIG. 2). Thus, the methods are described from the perspective of HCPM utility 145 (FIG. 1), DPS 100 (FIG. 1), and/or connection pooling model 200 (FIG. 2).

Figure 3B:
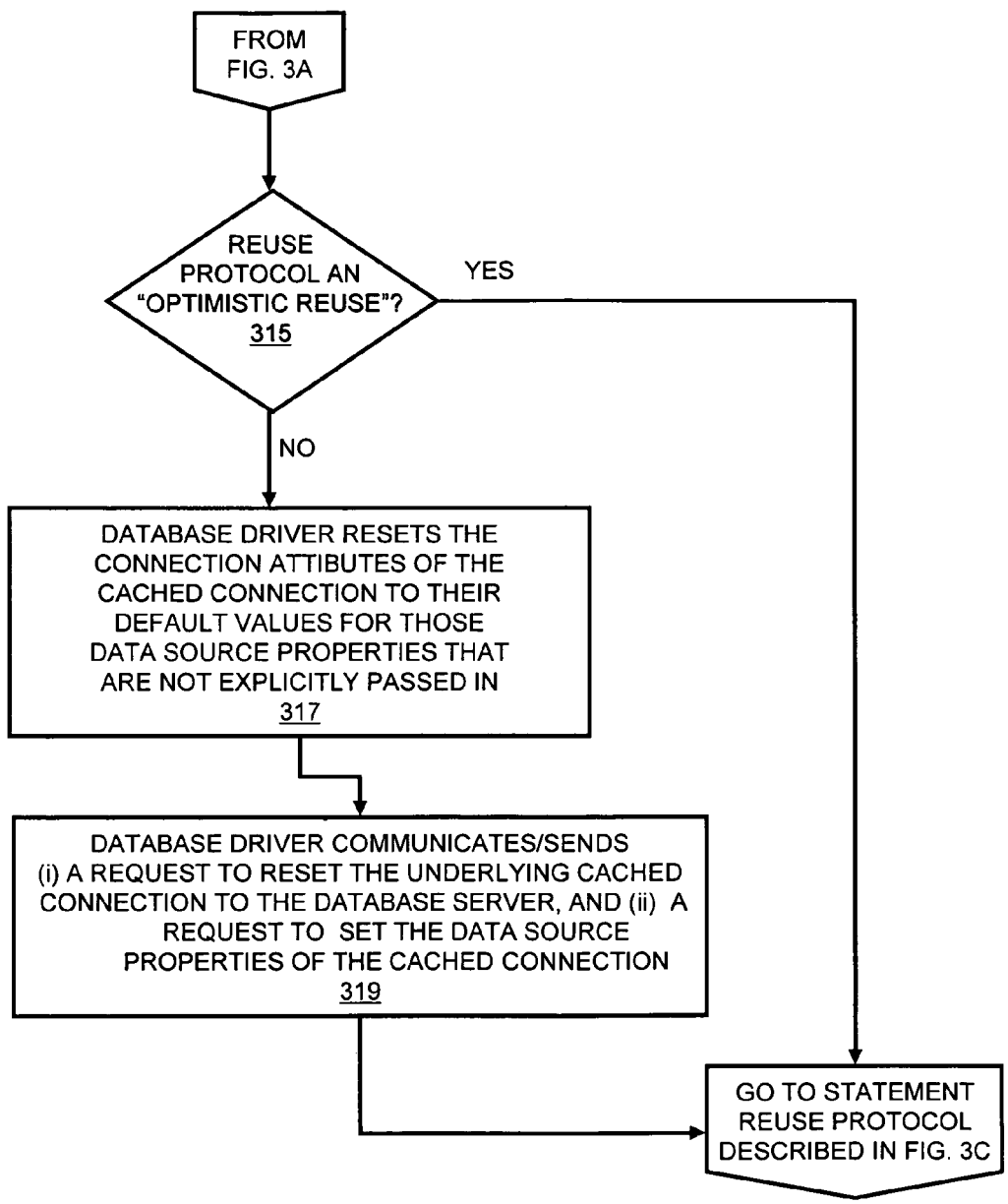
Figure 3D:
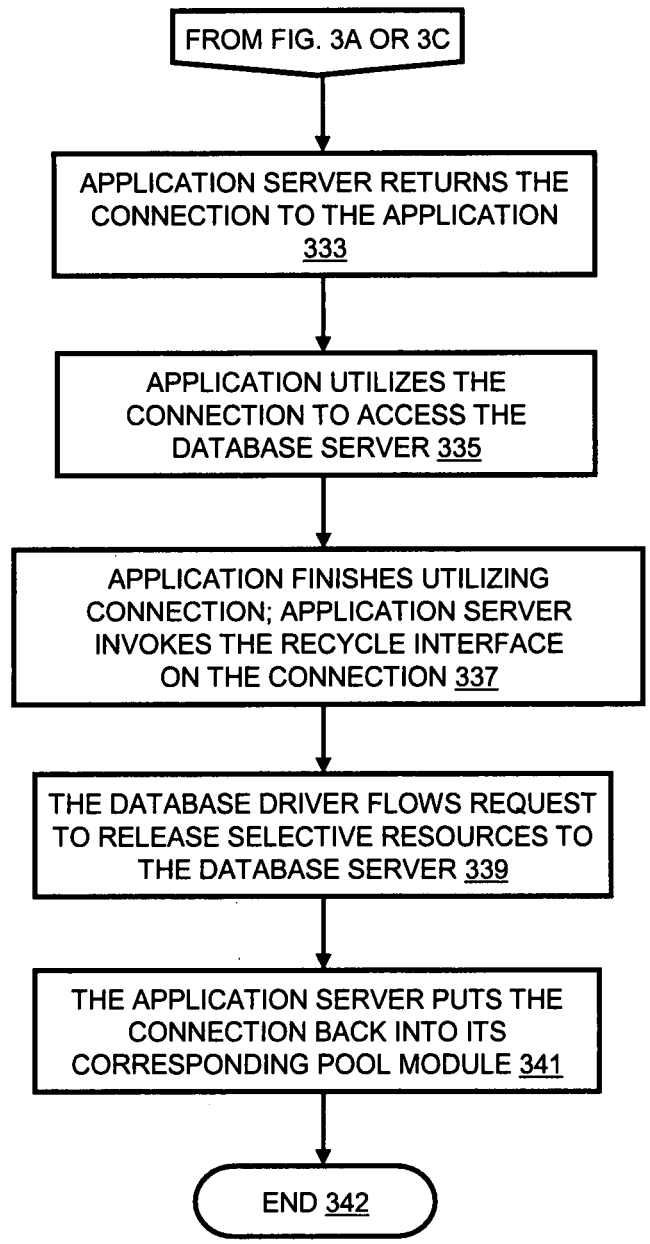

The process of FIG. 3 begins at initiator block 300 and proceeds to block 301, at which application 235 (FIG. 2) requests a connection from data source 230 via application server 210. Data source 230 has a specified set of data source properties. Application server 235 searches connection pool module 215 for an available cached connection, as depicted in block 303. A determination is then made as to whether there is an available cached connection in connection pool module 215, as depicted in decision block 305. If there is no cached connection available in connection pool module 215, the application server 210 requests a new connection with the specified data source property from a connection pool data source 240, using database driver 220, as depicted in block 307. After block 307, the method proceeds to block 309, in which a new connection is established from the database server 225 using the specified data source properties, and the connection is returned to application server 210. The method continues on through steps 333-341, as is depicted in FIG. 3D and described hereafter.

Referring again to block 305, if there is a cached connection available in connection pool module 215, one of three possible connection reuse protocols will be applied (i.e. "dirty reuse", "optimistic reuse", or "clean reuse"). The connection reuse protocols are used to configure how the connection is reset for reuse. Application 235 or application server 210 determines which connection reuse protocols are to be applied to the cached connection.

If the reuse protocol to be applied is a "dirty reuse" protocol, as determined from decision block 311, the connection attributes of the previously used cached connection are not cleaned up and all previous connection attributes remain in effect. The method continues on to the application of one of four statement reuse protocols (i.e. "no describe on reuse", "describe on reuse", "conditional describe on reuse", and "no reuse"), which are each illustrated in FIG. 3C and will be described in more detail below. However, if the requisite reuse interface protocol to be applied is not a "dirty reuse" protocol, HCPM utility 145 (FIG. 1) triggers database driver 220 to reinitialize the connection attributes of the cached connection with the data source properties, as depicted in block 313. Note the process described in block 313 is applicable to both "optimistic reuse" and "clean reuse" protocols.

With reference now to FIG. 3B, the method continues to decision block 315, in which a determination is made as to whether the reuse protocol to be applied is an "optimistic reuse" protocol. Under an "optimistic reuse" protocol, the clean up of the data source properties is only performed on the database driver-side. Moreover, special registers and global temp tables can be changed as data source properties, but should not be set through runtime interfaces (i.e. utilizing runtime interfaces bypasses the database driver 220) to avoid inconsistencies in data source property values between database server 225 and database driver 220. If an "optimistic reuse" protocol is utilized, the method continues on to the application of one of four statement reuse protocols (i.e. "no describe on reuse", "describe on reuse", "conditional describe on reuse", and "no reuse"), which are each illustrated in FIG. 3C and will be described in more detail below.

Referring again to block 315, if the requisite connection reuse protocol is not an "optimistic reuse" protocol, then the method proceeds to block 317 under the assumption that the only remaining connection reuse protocol that can be applied is a "clean reuse" protocol. Under a "clean reuse" protocol, database driver 220 will perform two steps pertaining to database driver-side clean-up. First, database driver 220 will reinitialize the connection attributes of the cached connection with data source properties passed in from connection pool module 215 (as described previously in block 313). Second, as depicted in block 317, database driver 220 resets the connection attributes of the cached connection to their default values for those data source properties that are not explicitly passed in by connection pool module 215. In addition to database driver-side clean-up, the "clean reuse" protocol performs database server-side clean-up, as depicted in block 319. In this regard, the database driver 220 (i) propagates a request to reset the underlying cached connection to the targeted database server 225, and (ii) propagates a request to reinitialize the data source properties of the cached connection, as shown in block 319.

Thus, the "clean reuse" protocol is applied when maximum flexibility of the heterogeneous connection pooling architecture is sought. When applying a "clean reuse" protocol, it becomes immaterial whether special registers and global temp tables have been set through runtime interfaces (i.e. database driver is bypassed) or through data source properties (i.e. database driver is not bypassed). Having finished applying the "clean reuse" connection reuse protocol, the method continues on to the application of one of four statement reuse protocols (i.e. "no describe on reuse", "describe on reuse", "conditional describe on reuse", and "no reuse"), which are each illustrated in FIG. 3C and will be described in more detail below.

With reference now to blocks 321-331 of FIG. 3C, the method continues with the application of one of four statement reuse protocols. A statement reuse protocol is applied when a previously used statement must be reset for reuse, or not reset for reuse. Similar to the connection reuse protocols, the statement reuse protocols are also determined by application 235 or application server 210, depending on whether the describe information needs to be kept, discarded, or replaced. As used herein, a statement enables the flow of a Structured Query Language (SQL) command on through to database server 225. Moreover, each statement corresponds to a particular SQL command. There are four types of statement reuse protocols: "no describe on reuse", "describe on reuse", "conditional describe on reuse", and "no reuse". Each statement reuse protocol will be described in greater detail over the course of the flow diagram in FIG. 3C.

Referring now to decision block 321, a determination is made as to whether the requisite statement reuse protocol is characterized for "no reuse". If a "no reuse" protocol is specified, database driver 220 closes all open statements associated with the cached connection and the cached connection is recycled to connection pool module 215 (block 323). As a result, a new statement object must be created such that a SQL command can be executed. The process then continues through the steps depicted in blocks 333-341 of FIG. 3D, which will be discussed hereafter.

With reference now to decision block 325, if the statement reuse protocol is one of some level of reuse (i.e. "no reuse" protocol is not applied), a determination is made as to whether the requisite statement reuse protocol is characterized as "no describe on reuse". If the statement reuse protocol is a "no describe on reuse" protocol, schema consistency is assumed across statement uses. As used herein, schema refers to the structure of a database system, described in a formal language supported by the database management system (DBMS). In a relational database, the schema defines the tables, the fields in each table, and the relationships between fields and tables. As a result of a "no describe on reuse" statement reuse protocol, previous describe information will always be retained (block 326) and no new describe information will need to flow. The process then continues through the steps depicted in blocks 333-341 of FIG. 3D.

With reference now to decision block 327, if the statement reuse protocol is not characterized as "no describe on reuse", a determination is made as to whether the requisite statement reuse protocol is characterized as a "conditional describe on reuse". If the statement reuse protocol is a "conditional describe on reuse", database driver 220 will intelligently determine, in decision block 329, whether critical properties (e.g. schema and SQL ID) have changed. As used herein, SQL ID defines an authorization ID, which determines the set of privileges associated with a dynamic SQL command. If (i) database driver 220 determines that a change of a critical property has occurred, or (ii) that statement reuse protocol is not "conditional describe on reuse", the statement reuse protocol that is then applied is "describe on reuse", as shown in block 331. Under "describe on reuse" statement protocol, schema consistency is not assumed between the first execution of the SQL command from the previous statement use and the subsequent execution of the SQL command to be reused. Since schema consistency is not assumed, database driver 220 marks all open statements associated with the cached connection as requiring describe information. The describe information provides a set of metadata information for the dynamic SQL command, as depicted in block 331. However, if the critical properties have not changed, new describe information is not required and the process then continues through the steps depicted in blocks 333-341 of FIG. 3D.

Referring now to FIG. 3D, the method continues to block 333, whereby application server 210 returns the cached or new connection to application 235. Application 235 utilizes the cached or new connection to access database server 225, as depicted in block 335. Once application 235 no longer requires the use of the cached or new connection, application server 210 invokes the recycle interface on the connection, as depicted in block 337. Under the recycle interface, database driver 225 communicates a request to release selective resources to database server 225, as depicted in block 339. The selective resources include, but are not limited to, cursors and transactions. Lastly, application server 210 places the used connection back into the connection's corresponding connection pool module, as depicted in block 341. The process terminates at block 342.

In the flow chart above (FIGS. 3A-3D), one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVD ROMs, and transmission type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for managing a heterogeneous connection pooling architecture at an application server, the method comprising:

receiving a connection request from an application for a data source having at least one specified data source property;

in response to an application server receiving the connection request, a processor managing the heterogeneous connection pooling architecture at the application server by:

searching a pool module for a cached connection, wherein the pool module is a heterogeneous pool that contains a plurality of pooled connections having different connection attributes, wherein the pooled connections are reused responsive to a request by the application, and wherein the pooled connections are cached across multiple data sources containing different data source properties;

returning, from the application server to the application, one of the cached connection and a new connection as a returned connection, wherein if the cached connection is available in the pool module, the cached connection is automatically selected as the returned connection;

determining which one of a dirty reuse protocol, an optimistic reuse protocol, and a clean reuse protocol is to be applied to the returned connection as a connection reuse protocol, wherein the connection reuse protocol provides a configuration for resetting the returned connection for reuse;

in response to the connection reuse protocol being the clean reuse protocol:

resetting the set of connection attributes of the cached connection to a set of default values of the set of connection attributes, wherein the set of connection attributes that are reset are one or more data source properties from the at least one specified data source property, wherein the one or more data source properties are not explicitly passed in by the connection pool module;

communicating a reset request to reset the cached connection to the database server; and communicating a set request to set the at least one specified data source property of the cached connection;

determining which one of a plurality of statement reuse protocols is to be applied as a statement reuse protocol for the returned connection, where a statement reuse protocol identifies whether a previous describe information for a connection is required to be retained, discarded, or replaced and wherein the plurality of statement reuse protocols comprises a no describe on reuse protocol, a describe on reuse protocol, a conditional describe on reuse protocol, and a no reuse protocol;

in response to determining the statement reuse protocol is a no describe on reuse protocol, the application server retaining the previous describe information for the returned connection;

closing all open statements associated with the cached connection if the statement reuse protocol is a no reuse protocol;

in response to the statement reuse protocol not being a no reuse protocol, placing the returned connection into the pool module; and connecting the application to a database server based on the determined connection reuse protocol and the statement reuse protocol.

2. The method of claim 1, the method further comprising:

in response to the cached connection not being available in the pool module:

requesting a new connection with the at least one specified data source property from a connection pool data source;

establishing the new connection from a database server using the at least one specified data source property; and returning the new connection to the application server as the returned connection.

3. The method of claim 1, the method further comprising:

in response to the statement reuse protocol being a conditional describe on reuse protocol:

determining whether at least one critical property of a statement has changed; and in response to determining that at least one critical property has changed, applying a describe on reuse protocol; and in response to the statement reuse protocol being a describe on reuse protocol, marking all open statements associated with the cached connection as requiring describe information.

4. The method of claim 1, further comprising:

in response to the connection reuse protocol being one of an optimistic reuse protocol and a clean reuse protocol:

reinitializing a set of connection attributes of the cached connection with the at least one specified data source property.

5. The method of claim 1, further comprising:

in response to an application server receiving the connection:

accessing the database server utilizing the returned connection;

terminating a use of the returned connection by the application; and communicating a release request to release a set of selective resources associated with the returned connection to the database server.

6. The method of claim 1, the method further comprising:

applying the determined connection reuse protocol to the returned connection; and applying the determined statement reuse protocol to the returned connection.

7. The method of claim 1, the method further comprising:

in response to the statement reuse protocol not being a no reuse protocol:

invoking a recycle interface on the returned connection.

8. A data processing system comprising:

a processor;

a system memory coupled to the processor; and a utility executing on the processor and having executable code that causes the data processing system to:

receive a connection request from an application for a data source having at least one specified data source property;

in response to receiving the connection request, the processor manages a heterogeneous connection pooling architecture at an application server by performing the functions of:

search a pool module for a cached connection, wherein the pool module is a heterogeneous pool that contains a plurality of pooled connections having different connection attributes, wherein the pooled connections are reused responsive to a request by the application, and wherein the pooled connections are cached across multiple data sources containing different data source properties;

return, from the application server to the application, one of the cached connection and a new connection as a returned connection, wherein if the cached connection is available in the pool module, the cached connection is automatically selected as the returned connection;

determine which one of a dirty reuse protocol, an optimistic reuse protocol, and a clean reuse protocol is to be applied to the returned connection as a connection reuse protocol, wherein the connection reuse protocol provides a configuration for resetting the returned connection for reuse;

in response to the connection reuse protocol being a clean reuse protocol:

reset the set of connection attributes of the cached connection to a set of default values of the set of connection attributes, wherein the set of connection attributes that are reset are one or more data source properties from the at least one specified data source property, wherein the one or more data source properties are not explicitly passed in by the connection pool module;

communicate a reset request to reset the cached connection to the database server; and communicate a set request to set the at least one specified data source property of the cached connection;

determine which one of a plurality of statement reuse protocols is to be applied as a statement reuse protocol for the returned connection, where a statement reuse protocol identifies whether a previous describe information for a connection is required to be retained, discarded, or replaced and wherein the plurality of statement reuse protocols comprises a no describe on reuse protocol, a describe on reuse protocol, a conditional describe on reuse protocol, and a no reuse protocol;

in response to determining the statement reuse protocol is a no describe on reuse protocol, retain the previous describe information for the returned connection;

close all open statements associated with the cached connection if the statement reuse protocol is a no reuse protocol;

in response to the statement reuse protocol not being a no reuse protocol, place the returned connection into the pool module; and connect the application to a database server based on the determined connection reuse protocol and the statement reuse protocol.

9. The data processing system of claim 8, the utility further having executable code that causes the data processing system to:

in response to the cached connection not being available in the pool module:

request a new connection with the at least one specified data source property from a connection pool data source;

establish the new connection from a database server using the at least one specified data source property; and return the new connection to the application server as the returned connection.

10. The data processing system of claim 8, the utility further having executable code that causes the data processing system to:

in response to the statement reuse protocol being a conditional describe on reuse protocol:

determine whether a critical property of a statement has changed; and in response to determining that at least one critical property has changed, apply a describe on reuse protocol; and in response to the statement reuse protocol being a describe on reuse protocol, mark all open statements associated with the cached connection as requiring describe information.

11. The data processing system of claim 8, the utility further having executable code for:

in response to the connection reuse protocol being one of an optimistic reuse protocol and a clean reuse protocol:

reinitialize a set of connection attributes of the cached connection with the at least one specified data source property.

12. The data processing system of claim 8, the utility further having executable code that causes the data processing system to:

in response to an application server receiving the connection:

access the database server utilizing the returned connection;

terminate a use of the returned connection by the application;

communicate a release request to release a set of selective resources associated with the returned connection to the database server.

13. The data processing system of claim 8, the utility further having executable code that causes the data processing system to:

apply the determined connection reuse protocol to the returned connection; and apply the determined statement reuse protocol to the returned connection.

14. The data processing system of claim 8, the utility further having executable code that causes the data processing system to:
  in response to the statement reuse protocol not being a no reuse protocol:
    invoke a recycle interface by the application server on the returned connection.

15. A computer program product comprising:
a computer storage medium; and
program code on the computer storage medium that when executed provides functions of:
  receiving a connection request from an application for a data source having at least one specified data source property;
  in response to receiving the connection request, triggering a processor executing the program code to manage a heterogeneous connection pooling architecture at an application server by:
    searching a pool module for a cached connection, wherein the pool module is a heterogeneous pool that contains a plurality of pooled connections having different connection attributes, wherein the pooled connections are reused responsive to a request by the application, and wherein the pooled connections are cached across multiple data sources containing different data source properties;
    returning, from the application server to the application, one of the cached connection and a new connection as a returned connection, wherein if the cached connection is available in the pool module, the cached connection is automatically selected as the returned connection;
    determining which one of a dirty reuse protocol, an optimistic reuse protocol, and a clean reuse protocol is to be applied to the returned connection as a connection reuse protocol, wherein the connection reuse protocol provides a configuration for resetting the returned connection for reuse;
    in response to the connection reuse protocol being a clean reuse protocol:
      resetting the set of connection attributes of the cached connection to a set of default values of the set of connection attributes, wherein the set of connection attributes that are reset are one or more data source properties from the at least one specified data source property, wherein the one or more data source properties are not explicitly passed in by the connection pool module;
      communicating a reset request to reset the cached connection to the database server; and
      communicating a set request to set the at least one specified data source property of the cached connection;
    determining which one of a plurality of statement reuse protocols is to be applied as a statement reuse protocol for the returned connection, where a statement reuse protocol identifies whether a previous describe information for a connection is required to be retained, discarded, or replaced and wherein the plurality of statement reuse protocols comprises a no describe on reuse protocol, a describe on reuse protocol, a conditional describe on reuse protocol, and a no reuse protocol;
    if the statement reuse protocol is a no describe on reuse protocol, the application server retaining a previous describe information;
    closing all open statements associated with the cached connection if the statement reuse protocol is a no reuse protocol;
    in response to the statement reuse protocol not being a no reuse protocol, placing the returned connection into the pool module; and
    connecting the application to a database server based on the determined connection reuse protocol and the statement reuse protocol.

16. The computer program product of claim 15, wherein the program code further provides the functions of:
  in response to the cached connection not being available in the pool module:
    requesting a new connection with the at least one specified data source property from a connection pool data source;
    establishing the new connection from a database server using the at least one specified data source property; and
    returning the new connection to the application server as the returned connection.

17. The computer program product of claim 15, wherein the program code provides the functions of:
  in response to the statement reuse protocol being a conditional describe on reuse protocol:
    determining whether a critical property of a statement has changed; and
    in response to determining that at least one critical property has changed, applying a describe on reuse protocol; and
  in response to the statement reuse protocol being a describe on reuse protocol, marking all open statements associated with the cached connection as requiring describe information.

18. The computer program product of claim 15, wherein the program code further provides the functions of:
  in response to the connection reuse protocol being one of an optimistic reuse protocol and a clean reuse protocol:
    reinitializing a set of connection attributes of the cached connection with the at least one specified data source property.

19. The computer program product of claim 15, the program code containing additional code that further provides the functions of:
  in response to an application server receiving the connection:
    accessing the database server utilizing the returned connection;
    terminating a use of the returned connection by the application;
    communicating a release request to release a set of selective resources associated with the returned connection to the database server; and
    in response to the statement reuse protocol not being a no reuse protocol:
      invoking a recycle interface on the returned connection.

20. The computer program product of claim 15, the program code further provides the functions of:
  applying the determined connection reuse protocol to the returned connection; and
  applying the determined statement reuse protocol to the returned connection.

* * * * *